S. B. RITTENHOUSE.

Lath-Machines.

No. 136,182.  Patented Feb. 25, 1873.

UNITED STATES PATENT OFFICE.

SILAS B. RITTENHOUSE, OF LARWILL, INDIANA.

IMPROVEMENT IN LATH-MACHINES.

Specification forming part of Letters Patent No. 136,182, dated February 25, 1873.

*To all whom it may concern:*

Be it known that I, SILAS B. RITTENHOUSE, of Larwill, in the county of Whitley and State of Indiana, have invented a new and useful Improvement in Lath-Machines; and I do declare that the following is a true and accurate description thereof, reference being had to the accompanying drawing and to the letters of reference marked thereon and being a part of this specification, in which—

Figure 1:
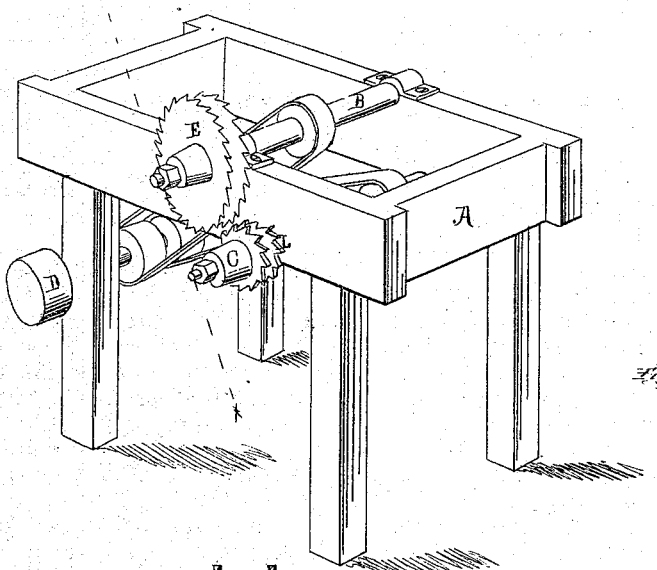
Figure 2:
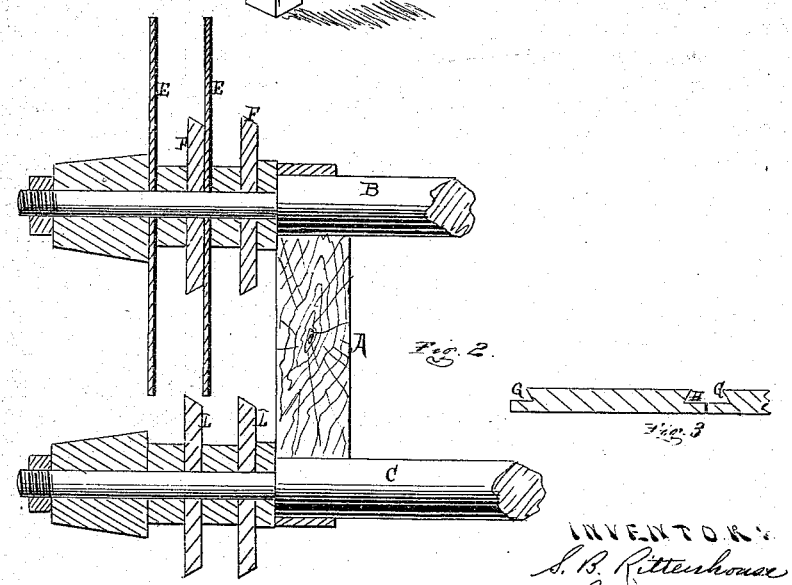
Figure 3:
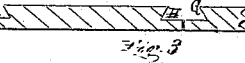

Figure 1 is a perspective view of my improved machine. Fig. 2 is a vertical section through the operating parts, showing the relation of the saws to each other and the general shape of the face or cutting-edge of the channel-saws. Fig. 3 is a cross-section, showing one finished lath and a section of another.

Like letters indicate like parts in each figure.

The nature of this invention relates to the construction of a machine for cutting or sawing laths, and at the same time sawing channels in the edges of the lath, for the purpose of holding the plaster. The invention consists in the peculiar construction and arrangement of the saws and operating parts, as more fully hereinafter described.

In the accompanying drawing, A represents a frame, to which are properly journaled, one above the other, the two saw-arbors B C, both being driven by means of belts from the driving-shaft D. The saws E are arranged upon the arbor B at sufficient distances apart, as may be required, to cut the lath at the proper thickness, and as many of them may be arranged in a gang upon the same arbor as may be desired. Upon the same arbor are also arranged a series of other saws, F, whose teeth are beveled edged, as shown, for the purposes of cutting the angular channels in the front edges of the lath, as shown in Fig. 3 at G. Upon the arbor C and directly beneath the saws F are arranged other and similar saws L, for the purpose of cutting similar channels in the opposite edges of the lath, as at H.

What I claim as my invention, and desire to secure by Letters Patent, is—

In lath-sawing machines, the combination of the saws E with the saws F L and arbors B C, substantially as and for the purposes set forth.

SILAS B. RITTENHOUSE.

Witnesses:
    CHARLES J. HUNT,
    THOS. S. SPRAGUE.